United States Patent [19]
Saito

[11] Patent Number: 5,680,182
[45] Date of Patent: Oct. 21, 1997

[54] NONLINEAR RESISTANCE FILMS SUITABLE FOR AN ACTIVE MATRIX LCD

[75] Inventor: Ken Saito, Mobara, Japan

[73] Assignee: Hitachi, Ltd., Tokyo, Japan

[21] Appl. No.: 552,309

[22] Filed: Nov. 2, 1995

[30] Foreign Application Priority Data

Nov. 11, 1994 [JP] Japan .................... 6-277881
Jan. 9, 1995 [JP] Japan .................... 7-001308

[51] Int. Cl.$^6$ ................... G02F 1/136; G02F 1/1333
[52] U.S. Cl. ........................... 349/41; 349/138
[58] Field of Search ..................... 359/58, 60, 74, 359/79; 349/41, 50, 51, 52, 122, 138

[56] References Cited

U.S. PATENT DOCUMENTS

| | | | |
|---|---|---|---|
| 4,031,498 | 6/1977 | Hayashi et al. | 338/21 |
| 4,560,241 | 12/1985 | Stolov et al. | 359/68 |
| 4,855,708 | 8/1989 | Nakata et al. | 338/20 |
| 4,871,234 | 10/1989 | Suzuki | 359/58 |
| 4,933,659 | 6/1990 | Imai et al. | 338/20 |
| 5,053,832 | 10/1991 | Uchida | 349/41 |
| 5,069,534 | 12/1991 | Hirai | 359/74 |
| 5,175,114 | 12/1992 | Ono et al. | 359/74 |
| 5,204,764 | 4/1993 | Maeda et al. | 359/58 |
| 5,396,354 | 3/1995 | Shimada et al. | 359/58 |
| 5,473,455 | 12/1995 | Koike et al. | 359/76 |
| 5,477,360 | 12/1995 | Sunohara et al. | 359/78 |
| 5,514,426 | 5/1996 | Eguchi | 359/75 |
| 5,521,731 | 5/1996 | Fukuyama et al. | 359/58 |
| 5,523,188 | 6/1996 | Choi | 359/53 |
| 5,559,619 | 9/1996 | Sato | 359/75 |

FOREIGN PATENT DOCUMENTS

| | | | |
|---|---|---|---|
| 58-126518 | 7/1983 | Japan | 359/58 |
| 6-43497 | 2/1994 | Japan . | |

OTHER PUBLICATIONS

"Phase Difference Film for STN LCD", Electronic Materials, Feb. 1991, pp. 37–41, Fujimura et al.

*Primary Examiner*—William L. Sikes
*Assistant Examiner*—Toan Ton
*Attorney, Agent, or Firm*—Antonelli, Terry, Stout & Kraus, LLP.

[57] ABSTRACT

A liquid crystal display device includes a first unit, a second unit and a liquid crystal layer. The first unit has a first substrate, plural first electrodes formed on the first substrate and in parallel, a first nonlinear resistance film having a thickness of about 0.3 to 0.5 μm and located to cover said first substrate and said plural first electrodes, and a first insulating film formed on said first nonlinear resistance film and to have a thickness of about 0.04 to 0.07 μm. The second unit has a second substrate, plural second electrodes formed on the second substrate and located in parallel to each other and to cross the first electrodes at right angles respectively, a second nonlinear resistance film having a thickness of about 0.3 to 0.5 μm and formed to cover said plural second electrodes and said second substrate, and a second insulating film formed on said second nonlinear resistance film and having a thickness of about 0.04 to 0.07 μm. The liquid crystal layer is formed between the first and the second units and to have a thickness of about 2.0 to 4.0 μm. In this device arrangement, the application of an ac driving voltage serves to reduce a resistance value of the nonlinear resistance film so that the almost of the ac driving voltage is applied to the liquid crystal layer. Hence, no restriction is burdened on the design of the LCD device.

18 Claims, 10 Drawing Sheets

NONLINEAR RESISTANCE FILMS SUITABLE FOR AN ACTIVE MATRIX LCD

BACKGROUND OF THE INVENTION

The present invention relates to a liquid crystal display apparatus, and more particularly to the liquid crystal display apparatus in which a dielectric constant and a thickness of a nonlinear resistance film are defined for enhancing a threshold voltage to be applied to the nonlinear resistance film and applying a sufficient voltage to a liquid crystal layer contained in the apparatus.

Recently, there has been developed a liquid crystal display device having a switching element layer laid between a first transparent electrode and its insulating film and a second transparent electrode and its insulating film. For example, JP-A-6-43497 had disclosed a liquid crystal display device having such a switching element layer.

SUMMARY OF THE INVENTION

It is an object of the present invention to provide a liquid crystal display device that is superior in an electro-optical characteristic through the active effect of a characteristic of a switching element layer.

According to a first aspect of the invention, the liquid crystal display apparatus includes a first unit, a second unit, and a liquid crystal layer, the first unit having a first substrate, plural first electrodes formed on the first liquid crystal layer and in parallel to each other, a first nonlinear resistance film having a thickness of about 0.3 to 0.5 μm and formed to cover the first substrate and those first electrodes, and a first insulating film having a thickness of about 0.04 to 0.07 μm and located to cover the first nonlinear resistance film, the second unit having a second substrate, plural second electrodes formed on the second substrate and located in parallel and to be orthogonal to the first electrodes respectively, a second nonlinear resistance film having a thickness of about 0.3 to 0.5 μm and located to cover those second electrodes and second substrate, and a second insulating film having a thickness of about 0.04 to 0.07 μm and located on the second nonlinear resistance film, and the liquid crystal layer formed to have a thickness of about 2.0 to 4.0 μm and located between the first unit and the second unit.

The first insulating film means a first alignment film. The second insulating film means a second alignment film. The first and the second alignment films serve to align liquid crystal molecules.

The first and the second nonlinear resistance films each have a dielectric constant of about 2.5 or lower.

The first and the second nonlinear resistance films each contain a sintered mixture of silicon dioxide and zinc oxide or tin oxide or titanium oxide.

In the sintered mixture, the weight ratio of zinc oxide or tin oxide or titanium oxide to silicon dioxide is about 9 to 1.

According to a second aspect of the invention, the liquid crystal display apparatus includes a unit substrate, a second unit and a liquid crystal layer, the first unit having a first substrate, plural first electrodes formed on the first substrate and located in parallel to each other, a nonlinear resistance film formed to have a thickness of about 0.3 to 0.5 μm and located to cover the first substrate and those first substrates, and a first insulating film formed to have a thickness of about 0.04 to 0.07 μm and located on the nonlinear resistance film, the second alignment film having a second substrate, plural second electrodes formed on the second substrate and located in parallel to each other and to be orthogonal to the first electrodes respectively, and a second insulating film formed to have a thickness of about 0.04 to 0.07 μm and located to cover the second substrate, and the liquid crystal layer formed to have a thickness of about 2.0 to 4.0 μm and located between the first and the second units.

According to a third aspect of the invention, the liquid crystal display apparatus includes a first unit, a second unit, and a liquid crystal layer, the first unit having a first substrate, plural first electrodes formed on the first substrate and located in parallel to each other, and a first insulating film formed to have a thickness of about 0.04 to 0.07 μm and located to cover those plural first electrodes and the first substrate, the second unit having a second substrate, plural second electrodes formed on the second substrate and located in parallel to each other and to be orthogonal to the first electrode, a nonlinear resistance film formed to have a thickness of about 0.3 to 0.5 μm and located to cover those second electrodes and the second substrate, and a second insulating film formed to have a thickness of about 0.04 to 0.07 μm and located on the nonlinear resistance film, and the liquid crystal layer formed to have a thickness of about 2.0 to 4.0 μm and located between the first and the second units.

According to a fourth aspect of the invention, a method for manufacturing the liquid crystal display apparatus includes, for making a first unit, the steps of forming on a first substrate plural first electrodes located in parallel, forming a first nonlinear resistance film having a thickness of about 0.3 to 0.5 μm in such a manner as to cover the first substrate and those first electrodes, and forming on the first nonlinear resistance film a first insulating film having a thickness of about 0.04 to 0.07 μm, for making a second unit, the steps of forming on a second substrate plural second electrodes located in parallel and to be orthogonal to the first electrode, forming a second nonlinear resistance film having a thickness of about 0.3 to 0.5 μm in such a manner as to cover those second electrodes and the second substrate, and forming on the second nonlinear resistance film a second insulating film having a thickness of about 0.04 to 0.07 μm, and the step of forming a liquid crystal layer having a thickness of about 2.0 to 4.0 μm between the first and the second units.

According to a fifth aspect of the invention, a method for manufacturing the liquid crystal display apparatus includes, for making a first unit, the steps of forming on a first substrate plural first electrodes located in parallel, forming a nonlinear resistance film having a thickness of about 0.3 to 0.5 μm in such a manner as to cover the first substrate and those first electrodes, and forming on the nonlinear resistance film a first insulating film having a thickness of about 0.04 to 0.07 μm, for making a second unit, the steps of forming on a second substrate plural second electrodes located in parallel and to be orthogonal to the first electrode, and forming a second insulating film having a thickness of about 0.04 to 0.07 μm in such a manner as to cover those second electrodes and the second substrate, and the step of forming a liquid crystal layer having a thickness of about 2.0 to 4.0 μm between the first and the second units.

According to a sixth aspect of the invention, a method for manufacturing the liquid crystal display device includes, for making a first unit, forming on a first substrate plural first electrodes located in parallel, and forming a first insulating film having a thickness of about 0.04 to 0.07 μm in such a manner as to cover the first substrate and those first electrodes, for making a second unit, the steps of forming on a second substrate plural second electrodes located in parallel and to be orthogonal to the first electrode, forming a second nonlinear resistance film having a thickness of about 0.3 to 0.5 μm in such a manner as to cover those second electrodes and the second substrate, and forming on the second nonlinear resistance film a second insulating film having a thickness of about 0.04 to 0.07 μm, and the step of forming a liquid crystal layer having a thickness of about 2.0 to 4.0 μm between the first and the second units.

As described above, the liquid crystal display device uses the nonlinear resistance film whose dielectric constant is about 2.5 or lower and whose thickness ranges from 0.3 to 0.5 μm. Hence, the application of an ac driving voltage serves to reduce a resistance of the nonlinear resistance film. After the resistance value is reduced, the almost of the ac driving voltage is applied to the liquid crystal layer. It means that the liquid crystal display device of the invention does not need so large an ac driving voltage. Hence, the application of an ac driving voltage does not restrict the design of the liquid crystal display device and the liquid crystal layer may be made thinner than the layer used in the LCD device of the prior art.

DESCRIPTION OF THE PREFERRED EMBODIMENTS

Hereinafter, the description will be oriented to an embodiment of the present invention with reference to the drawings.

Figure 1A:
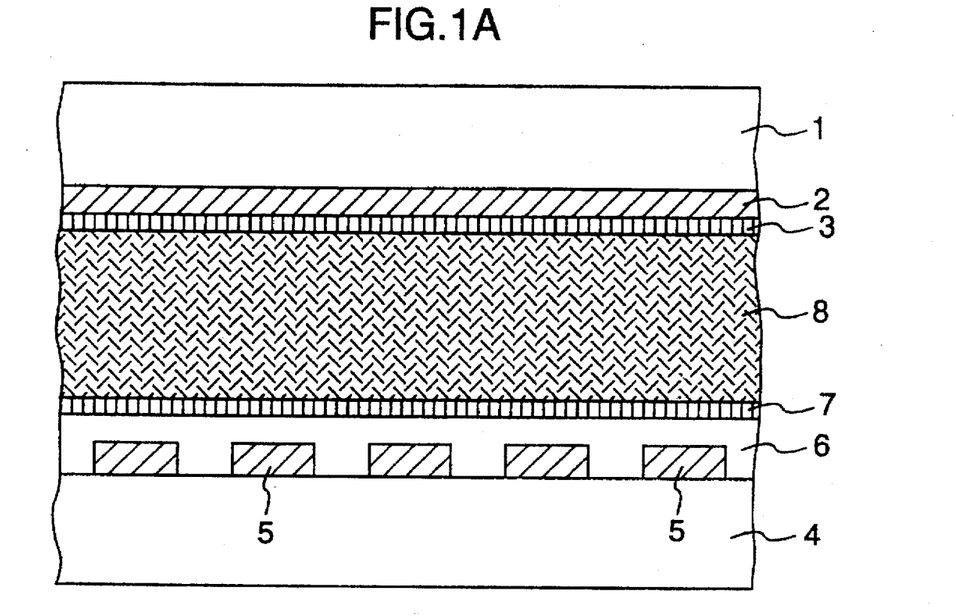
FIG. 1A is a section showing a liquid crystal display device according to an embodiment of the present invention.

FIG. 1A is a sectional view showing a liquid crystal display device (called a LCD device) according to a first embodiment of the present invention. The partial section of the LCD device is shown in this figure.

In FIG. 1A, a numeral 1 denotes a first transparent substrate. A numeral 2 denotes plural first transparent electrodes. A numeral 3 denotes a first insulating film made of high polymeric organic resin such as polyimide. A numeral 4 denotes a second transparent substrate. A numeral 5 denotes plural second transparent electrodes. A numeral 6 denotes a nonlinear resistance film served as a switching element layer. A numeral 7 denotes a second insulating film made of the same material as the first insulating film. A numeral 8 denotes a liquid crystal layer. The transparent substrate may be a glass or plastic material and the transparent electrode may be Indium Tin Oxide (ITO).

In the manufacturing process, the plural first transparent electrodes are located on the first transparent substrate 1 so that those first transparent electrodes are ranged in parallel and off the sheet of paper as keeping those electrodes spaced from each other. (In FIG. 1A, just one first transparent electrode is shown.) Then, the first insulating film 3 is formed on those first transparent electrodes 2. Turning to the second transparent electrode 4, the second transparent electrodes 5 are formed on the electrode 4 so that those second transparent electrodes 5 are ranged in parallel to each other and orthogonally to those first transparent electrodes, respectively. Like the first transparent electrodes, the second transparent electrodes 5 are spaced from each other. Next, the nonlinear resistance film 6 is formed on the plural second transparent electrodes 5. On the nonlinear resistance film 6, the second insulating film is formed. Then, the liquid crystal layer 8 is located between the first insulating film 3 and the second insulating film 7. The surfaces of the first insulating film 3 and the second insulating film 7 are subject to alignment processing. In this embodiment, each thickness of these films 3 and 7 is defined as 0.05 μm. In actual, this thickness may range from 0.04 to 0.07 μm. The nonlinear resistance film 6 is formed by coating a liquid mixture of zinc oxide (ZnO) and silicon dioxide ($SiO_2$) and then sintering the coat at a temperature of 230° C. In the liquid mixture, the weight ratio of zinc oxide to silicon dioxide is 9 to 1. This nonlinear resistance film 6 has a thickness of 0.3 μm and a dielectric constant of about 2.5, which is far lower than that of the known switching element layer. In actual, the thickness may range from 0.3 to 0.5 μm. Further, the liquid crystal layer 8 has a thickness of 3 μm, which is far thinner than that of the known liquid crystal layer. This thickness may range from 2.0 to 4.0 μm. Further, in place of zinc oxide, titanium oxide may be used.

More specifically, the LCD device is manufactured as follows. At first, the manufacturing process is directed to a first unit. The striped plural first transparent electrodes 2 are formed on the first transparent substrate 1. On the striped electrodes, the first insulating film 3 is formed to have a thickness of about 0.04 to 0.07 μm. The alignment processing is performed on the surface of the film 3. The result is the first unit. Then, the manufacturing process is directed to a second unit. On the second transparent substrate 4, the striped plural second transparent electrodes 5 are formed in such a manner as to cross the first transparent electrodes at right angles, respectively. On those electrodes 5, the non-linear resistance film 6 is formed to have a thickness of about 0.3 to 0.5 μm. This film 6 is formed by coating a liquid mixture of $SiO_2$ and each one of $ZnO_2$, $SnO_2$ and $TiO_2$ and sintering the coat at a temperature of about 200° to 250° C. Then, on the film 6, the second insulating film 7 is formed to have a thickness of about 0.04 to 0.07 μm. The alignment processing is performed on the surface of the film 7. The result is the second unit. Next, the first and the second units are located in opposition with a predetermined gap between both of the plates so that the first film 3 is opposed to the second film 4. The rims are provided around these units. Then, the first and the second units are pasted with each other by means of a frame-like sealing member (not shown herein, see a numeral 52 of FIG. 4) having a liquid crystal inlet (not shown herein, see a numeral 51 of FIG. 4) for injecting liquid crystal. Liquid crystal is injected into the gap and then the inlet is closed. In addition, the liquid crystal layer 50 has a thickness of about 2.0 to 3.5 μm. The first or the second transparent electrode 2 or 5 has a thickness of about 0.1 to 0.3 μm.

The composition of the LCD device shown in FIG. 1A may be vertically inverted on the drawing sheet. The inverted composition may be used quite similarly to the device shown in FIG. 1A.

Figure 1B:
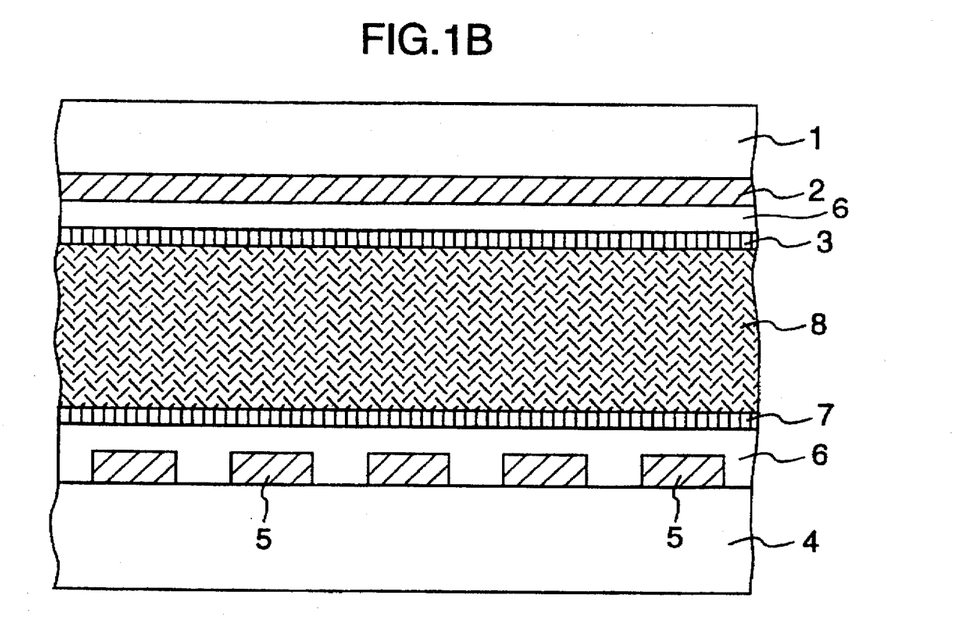
FIG. 1B is a section showing a liquid crystal display device according to another embodiment of the present invention.

FIG. 1B shows another LCD device. Like the film between the second transparent electrode 5 and the second insulating film 7 shown in FIG. 1A, the LCD device includes another nonlinear resistance film 6 formed between the first transparent electrode 2 and the first insulating film 3 of the device shown in FIG. 1A. The manufacturing process for the LCD device shown in FIG. 1B includes an additional step of forming the nonlinear resistance film 6 after forming the first transparent electrode 2. Hence, the same components as those shown in FIG. 1A have the same numerals and thus are not described in detail. Further, the LCD device shown in FIG. 1A or 1B may be composed as viewed from the rear surface of the drawing sheet.

In turn, the description will be oriented to the operations of the LCD device shown in FIGS. 1A and 1B.

Figure 2:
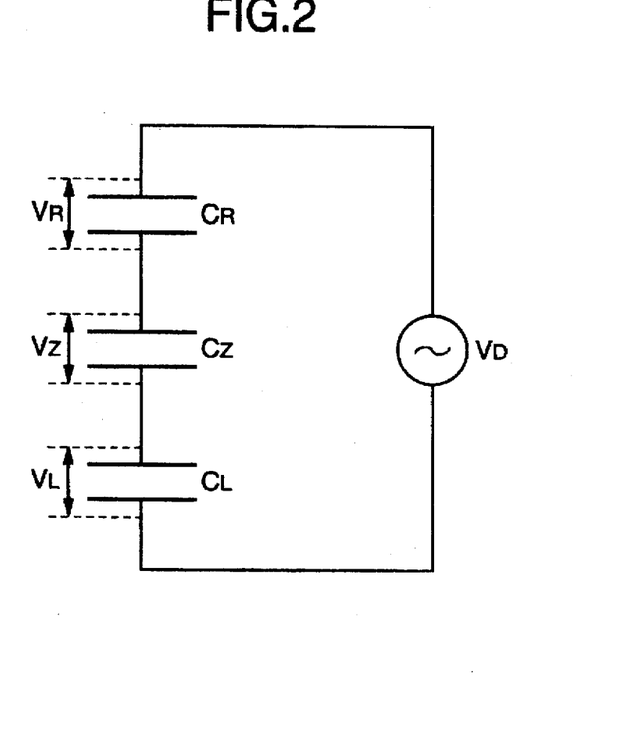
FIG. 2 is an explanatory supplement circuit diagram showing the operation of the liquid crystal display devices shown in FIGS. 1A and 1B.
Figure 3:
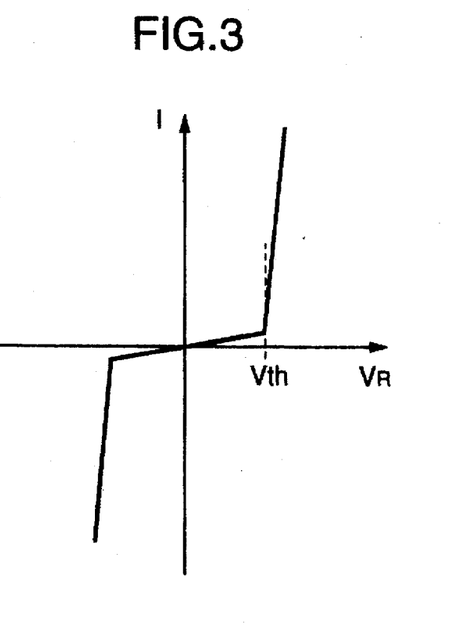
FIG. 3 is an explanatory supplement graph showing the operation of the liquid crystal display device.

Now, an ac driving voltage $V_D$ is applied between the plural first transparent electrodes 2 and the plural second transparent electrodes 5. As shown in FIG. 2, the ac driving voltage $V_D$ is divided by a capacitance $C_R$ formed between both surfaces of the nonlinear resistance film 6, a capacitance $C_Z$ formed between the first insulating film 3 and the second insulating film 7, and a capacitance $C_L$ formed in the liquid crystal layer 8. The divided voltage $V_R$, $V_Z$ or $V_L$ appears at both ends of each capacitance $C_R$, $C_Z$ or $C_L$, respectively. The divided voltage $V_R$, $V_Z$ or $V_L$ is reversely proportional to the capacitance $C_R$, $C_Z$ or $C_L$, respectively. At the initial stage of the application of the ac driving voltage $V_D$, since the nonlinear resistance film has so low a dielectric constant as 2.5 and so thin a thickness as 0.3 μm, the value of the capacitance CR formed between both surfaces of the nonlinear resistance film 6 is far smaller than the other capacitances $C_Z$ and $C_L$. The divided voltage $V_R$ at both ends of the capacitance $C_R$ is far larger than the divided voltage $V_Z$ or $V_L$ at both ends of the capacitance $C_Z$ or $C_L$. In other words, most of the ac driving voltage is applied to both ends of the capacitance $C_R$. As such, the application of a large voltage to both surfaces of the nonlinear resistance film 6 serves to abruptly reduce the resistance through the effect of a nonlinear resistance characteristic shown in FIG. 3. Hence, the voltage applied to both ends of the capacitance $C_R$ is lowered to a threshold voltage Vth of the nonlinear resistance film 6, that is, about 0.2 V.

Then, the abrupt reduction of the voltage applied to both ends of the capacitance $C_R$, which is formed between both surface of the nonlinear resistance film 6, results in applying most of the ac driving voltage $V_D$ to the capacitance $C_L$ having a relative small capacitance value. In the conventional LCD device, most of the ac driving voltage $V_D$ has been applied to both ends of the capacitance $C_R$. That is, most of the ac driving voltage $V_D$ is applied to the liquid crystal layer. This application of the ac driving voltage $C_D$ achieves a necessary display function of the liquid crystal layer 8.

As set forth above, according to the first embodiment of the invention, the nonlinear resistance film 6 has a far lower dielectric constant and a thicker thickness than the known switching element layer for reducing the capacitance $C_R$ formed between both surfaces of the nonlinear resistance film 6. This reduction results in applying most of the ac driving voltage $V_D$ for abruptly lowering the resistance value of the nonlinear resistance film 6 and applying most of the ac driving voltage $V_D$ to the liquid crystal layer 8 according to the lowered resistance value of the nonlinear resistance film 6. Hence, the LCD device of this embodiment does not need so large an ac driving voltage and thus is not subject to any restriction. Further, the LCD device may provide a thinner liquid crystal layer 8 than the conventional LCD device. The thin layer 8 may offer an optically excellent LCD device.

Next, the description will be oriented to an LCD device according to a second embodiment of the invention.

In the foregoing first embodiment, the thickness of the first insulating film 3 or the second insulating film 7 is 0.05 μm. The nonlinear resistance film 6 is composed of zinc oxide and silicon oxide and has a thickness of 0.3 μm. The thickness of the liquid crystal layer 8 is 3 μm. In the following second embodiment, on the other hand, though the LCD device has the same composition as the above, the film thickness and the composition of the nonlinear resistance film 6 are different from those of the first embodiment.

In the second embodiment, the first insulating film 3 and the second insulating film 7, each surface of which is subject to the alignment processing, have a thickness of 0.07 μm. Like the first embodiment, the liquid crystal layer 8 has a thickness of 4 μm that is far thinner than the thickness of the known liquid crystal layer. The nonlinear resistance film 6 is formed by coating a liquid mixture of tin oxide (SnO) and silicon dioxide ($SiO_2$) and sintering the coat at 250° C. In the liquid mixture, the weight ratio of tin oxide to silicon dioxide is 9 to 1. The film 6 has a dielectric constant of about 2.8, which is far lower than the dielectric constant of the known switching element layer.

The LCD device of the second embodiment having the foregoing composition substantially operates in the similar manner to the LCD device of the first embodiment. Hence, the operation of the second embodiment is not described.

The LCD device of the second embodiment offers the similar effect as the LCD device of the first embodiment. Hence, the description about the effect is not described as well.

The present invention is characterized in that the nonlinear resistance film 6 has a low dielectric constant and a thick thickness and the liquid crystal layer 8 has a thin thickness. In practice to execute the operations, the function and the effect described with respect to the first and the second embodiments, the experiment has reported the following conditions are just necessary. The nonlinear resistance film 6 has a dielectric constant of 3 or less (where since no material having a dielectric constant of 2 or less and a nonlinear resistance characteristic is still found out, the actual dielectric constant is 2 or more) and has a thickness of 0.3 to 0.5 μm. And, the liquid crystal layer 8 has a thickness of 2 to 4 μm.

Next, the description will be oriented to an LCD device according to another embodiment of the invention.

Figure 4A:
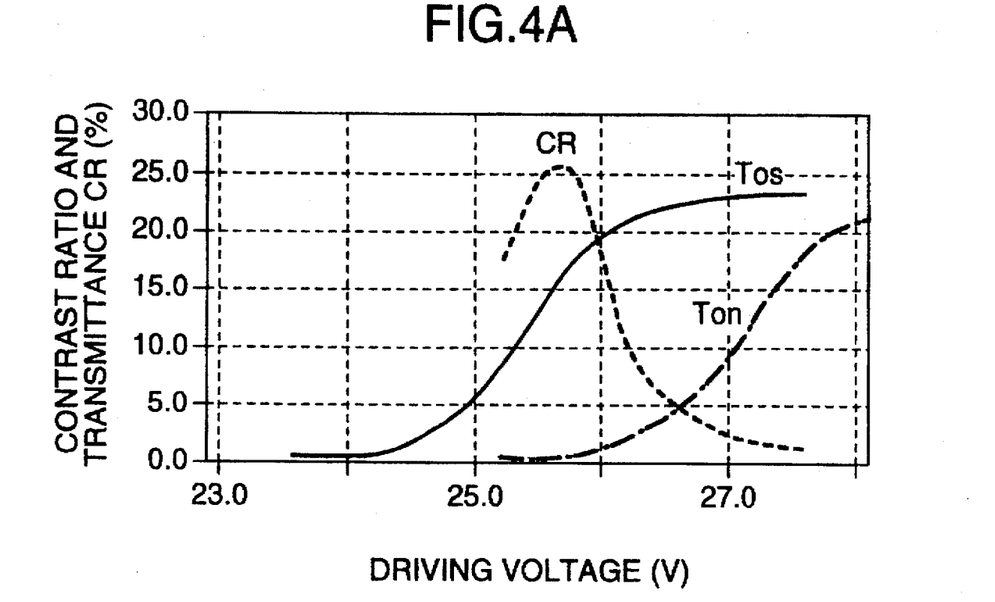
FIG. 4A is a graph showing an operating characteristic of the liquid crystal display device according to the invention.
Figure 4B:
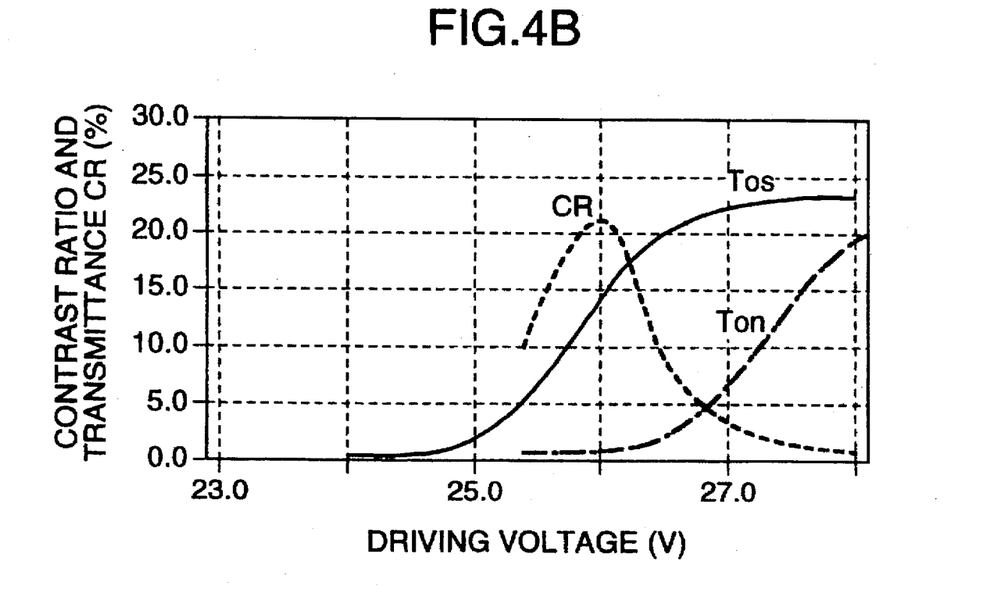
FIG. 4B is a graph showing an operating characteristic of a liquid crystal display device having no nonlinear resistance film.

FIG. 4A shows an electro-optical characteristic of the LCD device shown in FIG. 1A if the nonlinear resistance film 1 has a threshold voltage $V_{th}$ of 0.2 V. FIG. 4B shows an electro-optical characteristic of an LCD device provided with no nonlinear resistance film for comparison with the characteristic shown in FIG. 4A. As shown in FIGS. 4A and 4B, an axis of abscissa is a driving voltage (V) and an axis of ordinance is a light transmittance (%) and a contrast ratio. $T_{os}$ is a light transmittance of an active pixel. $T_{on}$ is a light transmittance of an inactive pixel. CR is a contrast ratio. That is, $T_{os}/T_{on}$ corresponds to a contrast rate.

As is obvious from the comparison of FIG. 4A with FIG. 4B, the driving voltage of FIG. 4A is a bit higher but the contrast ratio of FIG. 4A is improved, that is, changed from 21 to 26.

As set forth above, the LCD device according to this embodiment is arranged to use the structure shown in FIG. 1A in which the liquid crystal layer 8, the nonlinear resistance film 6, the second insulating film 7 and the first insulating film 3 have the foregoing thicknesses. This structure allows the application of a voltage of 0.2 V or more to the nonlinear resistance film 6 and the nonlinear resistance film 6 to serve as a switch and the operating voltage range to be expanded for improving an optical characteristic. Moreover, the simple matrix type LCD device allows an operating voltage for an inactive pixel to be raised. This makes contribution to enhancing the electro-optical characteristic of the LCD device. The simple matrix type LCD device needs a more simpler manufacturing process than the active matrix type LCD device that provides a thin film transistor or a metal—insulating film—metal element (MIM) as a switching element. Hence, the manufacturing cost of the LCD device is made lower.

Figure 5:
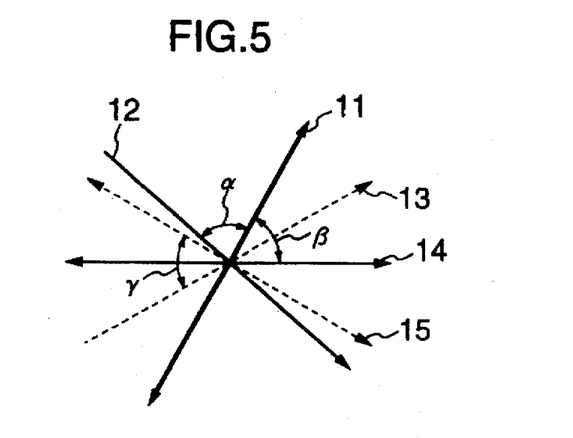
FIG. 5 is an explanatory view showing a relation among an aligning and a twisting directions of liquid crystal molecules, an axial direction of a polarizing plate, and an optical axis of a birefringent member.
Figure 6:
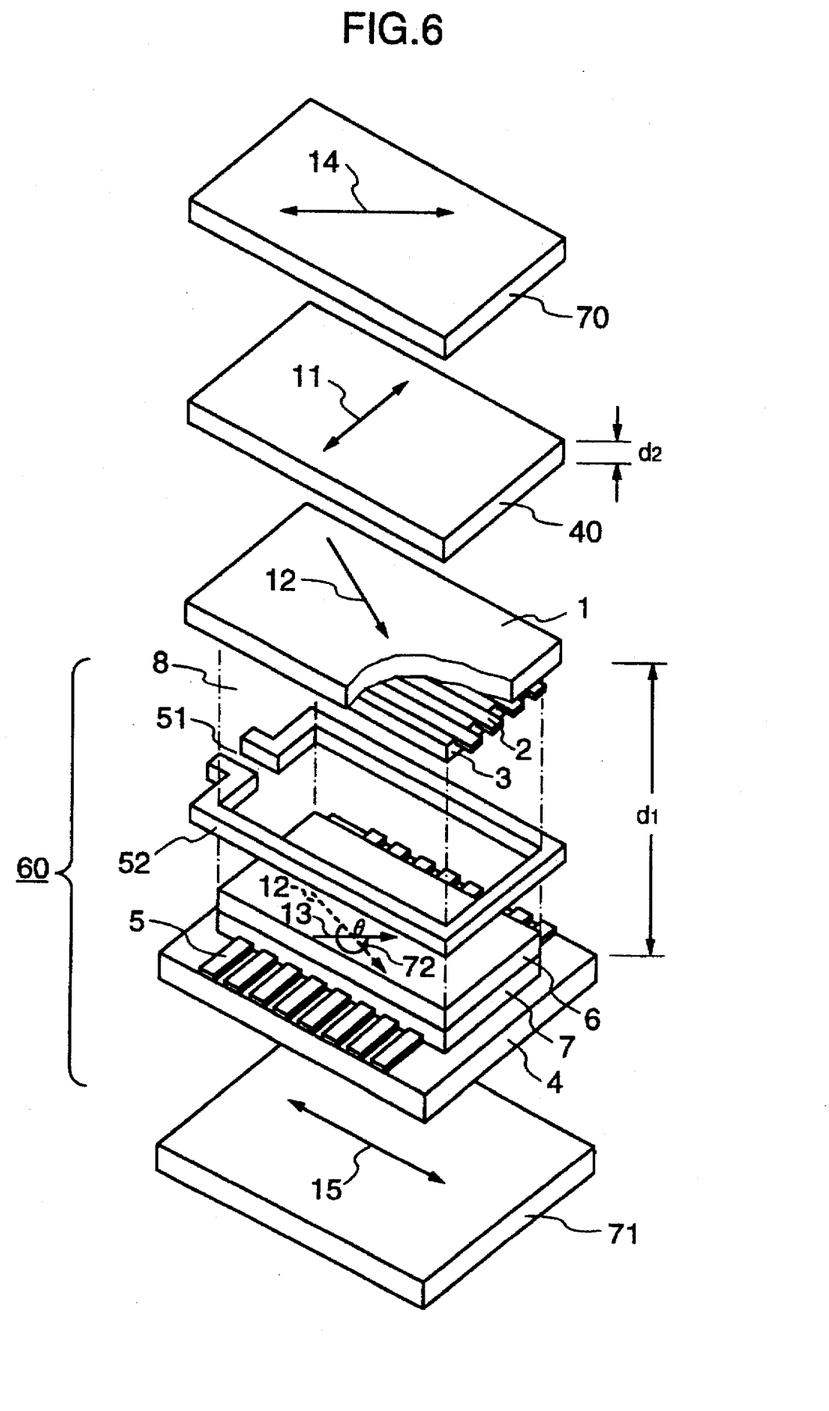
FIG. 6 is an exploded perspective view showing the liquid crystal display device.

FIG. 5 shows an aligning direction (for example, rubbing direction) of liquid crystal molecules, a twisting direction of liquid crystal molecules, an axial direction of polarization (or axial direction of absorption) of a polarizing plate, and an optical axial direction of a member provided for bringing about a birefringent effect on an electrode substrate if the LCD device to which the present invention is applicable is viewed from the top. The numerals of FIG. 5 correspond to the numerals of FIG. 6, respectively. Hence, see the description about FIG. 6 for FIG. 5. FIG. 6 is a perspective view showing an essential part of an LCD element 62.

In FIG. 6, a twisting direction 10 and a twisting angle θ of the liquid crystal molecules are defined by a rubbing direction 12 of the first insulating film 3 formed on the first transparent substrate 1, a rubbing direction 13 of the second insulating film 7 formed on the second transparent substrate 4, a kind and a quantity of optically active substance added to the liquid crystal layer 8 having a positive dielectric aeolotropy and laid between the first transparent substrate 11 and the second transparent substrate 14.

In FIG. 6, to align the liquid crystal molecules between the first and the second transparent substrates 1 and 4 in a twisting manner, for example, it is possible to use a rubbing method in which the rubbing operation is executed on the surfaces of the first and the second insulating films 3 and 7 made of high polymeric organic resin such as polyimide, those films being formed on the first and the second transparent substrates 1 and 4 made of glass and contacting the liquid crystal molecules. The rubbing is done by something like cloth. The rubbing direction, concretely, the rubbing direction 12 for the first transparent substrate 1 and the rubbing direction 13 for the second transparent substrate 4 indicate the aligning direction of the liquid crystal molecules. The first and the second transparent substrates 1 and 4, the surfaces of which are aligned, are opposed to each other with a gap of $d_1$ so that the rubbing directions 12 and 13 are crossed with each other at about 180 to 360 degrees. Then, these substrates 1 and 4 are pasted by a frame-like sealing member 52 having a cut-away portion, that is, a liquid crystal inlet 51 from which the liquid crystal is injected to the gap between the substrates. By injecting nematic liquid crystal having a predetermined amount of optically active substance added thereto and a positive dielectric aeolotropy and sealing the cut-away portion, the liquid crystal molecules contained in the gap are aligned spirally at a twisting angle θ. The first and the second transparent electrodes 2 and 5 are made of indium oxide or ITO (Indium Tix Oxide). On the top of the first transparent substrate 1 of the liquid crystal cell 60 composed as above, there is located a member for bringing about a birefringent effect (that is called a birefringent effect. Fujimura, et.al., "Phase Difference Film for STN-LCD", Electronic Materials, February 1991, pp 37–41). The first and the second polarizing plates 70 and 71 are provided between the birefringent member 40 and the liquid crystal cell 60.

The twisting angle θ of the liquid crystal molecules contained in the liquid crystal layer 8 may range from 180 to 360 degrees, preferably, 200 to 300 degrees. From a practical point of view, that is, to avoid such an alignment as causing an active pixel located near a threshold value of a transmittance to applied voltage curve to scatter light and keep a superior time-dividing characteristic, it is more preferable to restrict the range of the twisting angle θ between 230 and 270 degrees. This range fundamentally allows the liquid crystal molecules to be more sensitive to the voltage and hence implements a superior time-dividing characteristic. To obtain the superior display quality, it is preferable to restrict a product $\Delta n_1 \cdot d_1$ of an index aeolotropy $\Delta n_1$ and a thickness $d_1$ of the liquid crystal layer 8 in the range of 0.5 to 1.0 μm, more preferably, 0.6 to 0.9 μm.

The birefringent member 40 serves to modulating a polarizing state of light transmitted through the liquid crystal cell 60. That is, the member 40 serves to change the display to a monochrome display though only the liquid crystal cell 60 itself enables to realize a coloured display. For this purpose, a product of $\Delta n_2 \cdot d_2$ is quite important, where $\Delta n_2$ denotes an index aeolotropy of the birefringent member 40 and $d_2$ denotes its thickness. The product is preferably defined from 0.4 to 0.8 μm, more preferably, 0.5 to 0.7 μm.

Further, the LCD device uses the elliptic polarization caused by the birefringent effect. Hence, an important factor is placed on a relation among the axes of the polarizing plates 70 and 71, the optical axis of an uniaxial birefringent plate if the plate is used as the birefringent member 40, and the liquid crystal aligning directions 12 and 13 of the first and the second transparent substrates 1 and 4 of the liquid crystal cell 60.

The description will be oriented to the function and the effect of the foregoing relation with reference to FIG. 5. FIG. 5 shows the relation among the axis of the polarizing plate, the optical axis of the uniaxial birefringent member, and the aligning direction of the liquid crystal molecular axes of the electrode substrates of the liquid crystal cell. This figure shows the LCD device viewed from the top.

In FIG. 6, a numeral 11 denotes an optical axis of an uniaxial transparent birefringent member 40. A numeral 12 denotes an aligning direction of the liquid crystal molecular axes of the birefringent member 40 and the first transparent substrate 1 adjacent to the member 40. A numeral 13 denotes an aligning direction of the liquid crystal of the second transparent substrate 4. A numeral 14 denotes an axis of polarization or an axis of absorption of the first polarizing plate 70. A numeral 15 denotes an axis of polarization or an axis of absorption of the second polarizing plate 71. An angle α denotes an angle formed between the liquid crystal aligning direction 12 of the first transparent substrate 1 and the optical axis 11 of the uniaxial birefringent member 40. An angle β denotes an angle formed between an axis of absorption or an axis of polarization of the first polarizing plate 70 and the optical axis of the uniaxial birefringent member 40. An angle γ denotes an angle formed between an axis of absorption or an axis of polarization 15 of the second polarizing plate 71 and the liquid crystal aligning direction of the second transparent substrate 4.

Figure 7A:
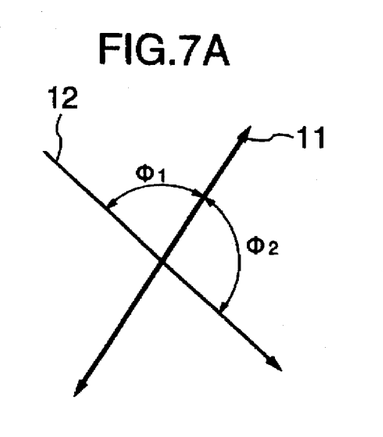
FIGS. 7A and 7B are explanatory views showing how to measure an angle α of the optical axis of the birefringent member to the aligning direction of the liquid crystal molecular axis of the first transparent substrate, an angle β of the optical axis of the birefringent member to a polarizing axis of a first polarizing plate, and an angle γ of the liquid crystal aligning direction of the transparent substrate to a polarizing axis of a second polarizing plate.
Figure 7B:
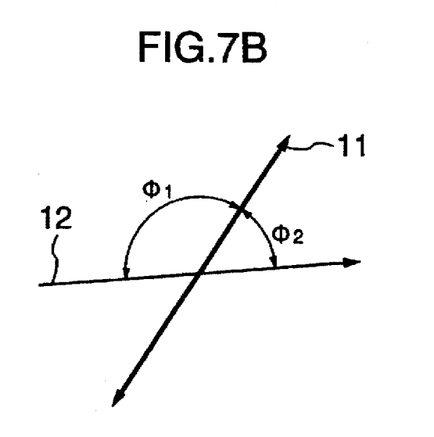

Herein, how to measure the angles α, β and γ in this specification is defined. In FIGS. 7A and 7B, the description is expanded on an intersection angle between the optical axis 11 of the birefringent member 40 and the liquid crystal aligning direction of the first transparent substrate 1. As shown in FIGS. 7A and 7B, the intersection angle between the optical axis 11 and the aligning direction 12 of the liquid crystal may be represented by $\phi_1$ and $\phi_2$. In this specification, a smaller one of the angles $\phi_1$ and $\phi_2$ is adopted. That is, in FIG. 8A, since $\phi_1 < \phi_2$ is set, $\phi_1$ denotes the intersection angle a formed between the optical axis 11 and the aligning direction 12 of the liquid crystal. In FIG. 8B, since $\phi_1 > \phi_2$ is set, $\phi_2$ denotes an intersection angle formed between the optical axis 5 and the aligning direction 12 of the liquid crystal. If $\phi_1 = \phi_2$, any one of them may be adopted.

The angles α, β and γ are quite important for the LCD device.

Preferably, the angle α ranges from 50 to 90 degrees, more preferably, 70 to 90 degrees. The angle β ranges from 20 to 70 degrees, more preferably, 30 to 60 degrees. The angle γ ranges from 0 to 70, more preferably, 0 to 50 degrees.

In a case that the twisting angle α, β and θ of the liquid crystal layer 8 of the liquid crystal cell 60 ranges from 180 to 360 degrees, those angles α, β and γ are just required to stay in the ranges even if the twisting direction 72 is clockwise or anticlockwise.

In FIG. 6, the birefringent member 40 is located between the first polarizing plate 70 and the first transparent substrate 1. In place, it may be located between the second transparent substrate 4 and the second polarizing plate 71. This location corresponds to the inverted composition shown in FIG. 6.

Figure 8:
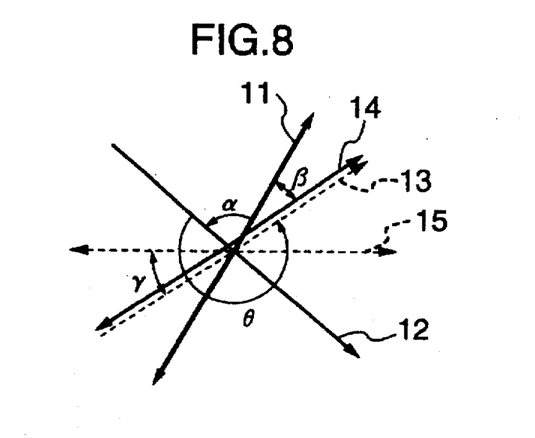
FIG. 8 is an explanatory view showing a relation among an aligning and a twisting directions of liquid crystal molecules, an axial direction of the polarizing plate, and an optical axis of the birefringent member.

FIG. 8 shows a concrete arrangement of the twisting angle θ and the like. As shown, the twisting angle θ of the liquid crystal molecules is 240 degrees. The uniaxial transparent birefringent member 40 uses the liquid crystal cell with the parallel alignment (homogeneous alignment), that is, the twisting angle of 0. Herein, the ratio of d/p is 0.67, where d denotes a thickness μm of the liquid crystal layer and p denotes a spiral pitch μm of the liquid crystal material containing an optically active material added thereto. The first and the second insulating films 3 and 7 are made of polyimide resin films that are rubbed. The insulating film serves to tiltably align the liquid crystal molecules with which the film contacts against the plane of the substrate. The tilting angle (pretilt angle) is four degrees. $\Delta n_2 \cdot d_2$ of the uniaxial transparent birefringent member 40 is about 0.6 μm. On the other hand, $\Delta n_1 \cdot d_1$ of the liquid crystal layer whose molecules are twisted by 240 degrees is about 0.8 μm.

If the angle α is set as about 90 degrees, the angle β is set as about 30 degrees and the angle γ is set as about 30 degrees, when the voltage applied to the liquid crystal layer 8 through the first and the second transparent electrodes 2 and 5 is equal to or lower than the threshold value, the corresponding pixel does not transmit light, that is, the pixel represents a black dot. When the voltage is higher than the threshold value, the corresponding pixel transmits light, that is, the pixel represents a white dot. Hence, the resulting liquid crystal display implements a monochrome display. Further, if the axis of the second polarizing plate 71 is rotated through an angle of 50 to 90 degrees from the above location, conversely, when the voltage applied to the liquid crystal layer 8 is equal to or lower than the threshold value, the corresponding pixel represents a white dot. When the voltage is higher than the threshold value, the pixel represents a black dot. That is, the inverted monochrome display may be implemented.

Figure 9:
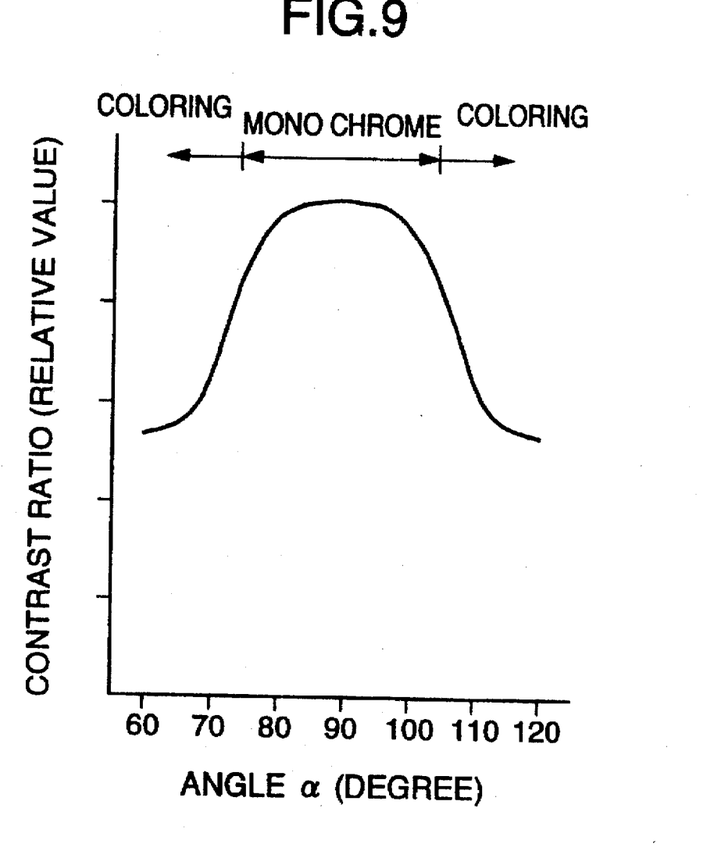
FIG. 9 is a graph showing a characteristic of the angle α to a contrast ratio.

FIG. 9 shows the change of a contrast ratio appearing when the LCD device as shown in FIG. 8 is driven at a time divisional rate of 1/200 duty as changing the angle α. When the angle α is close to 90 degrees, the display represents a quite high contrast. As the angle is shifted horizontally on the angle of 90 degrees, the contrast is made lower. Further, when the angle α is made far smaller, the active and the inactive points are both bluing. When the angle α is made far larger, the inactive point is purple and the active point is yellow. In both cases, the monochrome display is made impossible. This substantially holds true to the angles β and γ. For the angle γ, likewise, if the axis of the first polarizing plate is rotated through an angle of 50 to 90 degrees, the inverted monochrome display may be implemented.

FIG. 8 shows another concrete examples of the twisting angle θ and the like. The fundamental structure is the same as the structure shown in FIG. 8 except that the twisting angle of the liquid crystal molecules is 260 degrees and $\Delta n_1 \cdot d_1$ is about 0.65 to 0.75 μm. Like the foregoing concrete example, $\Delta n_2 \cdot d_2$ of the parallel aligning liquid crystal layer used as the uniaxial transparent birefringent member 40 denotes about 0.58 μm. The ratio of d/p is 0.72, in which d/p is a ratio of a thickness $d_1$ (μm) of the liquid crystal layer to a spiral pitch p (μm) of the nematic liquid crystal material having an optically active material added thereto.

In a case that the angle α is set as about 100 degrees, the angle β is set as about 35 degrees and the angle γ is set as about 15 degrees, the monochrome display may be implemented as well. Further, likewise, if the axis of the second polarizing plate is rotated through an angle of 50 to 90 degrees from the above location, the inverted monochrome display is made possible as well. The tendency to the shift of the angle α, β or γ of the first concrete example holds true to this example.

In any concrete example, the parallel aligning liquid crystal cell whose liquid crystal molecules are not twisted uses the uniaxial transparent birefringent member 40. The use of the liquid crystal layer whose molecules are twisted through an angle of 20 to 60 degrees lessens the change of color according to the change of angle. Like the foregoing liquid crystal layer 8, the liquid crystal layer whose molecules are twisted is formed by pasting the substrates so that the aligning directions of the pair of aligned transparent electrodes are crossed with the predetermined twisting angle and injecting the liquid crystal between the substrates. In this case, the optical axis of the birefringent member may be used as the direction of the bisected one of the angle formed between the two aligning directions. Further, the birefringent member 40 may use a transparent polymer film (preferably, an uniaxial stretching one). The effective polymer film is PET (polyethylene terephthalate), acryle resin film, or polycarbonate.

In the foregoing embodiments, the birefringent member is single. In the structure shown in FIG. 6, another birefringent member may be inserted between the second transparent substrate 4 and the second polarizing plate 71 in addition to the birefringent member 40. $\Delta n_2 \cdot d_2$ of these birefringent members are rearranged.

Figure 10:
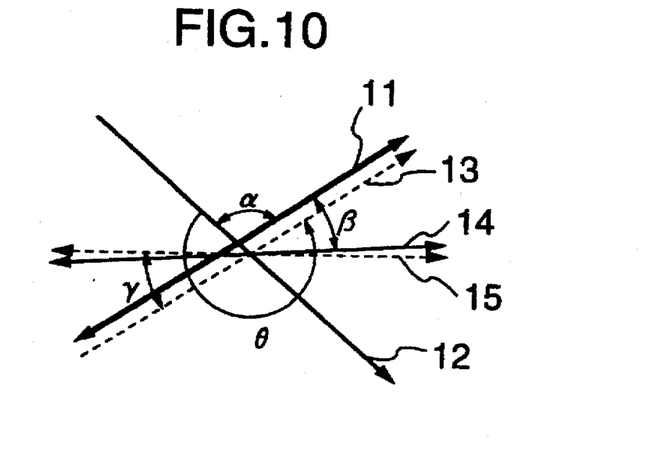
FIG. 10 is an explanatory view showing a relation among an aligning and a twisting directions of liquid crystal molecules, an axial direction of the polarizing direction, and an optical axis of the birefringent member.
Figure 11:
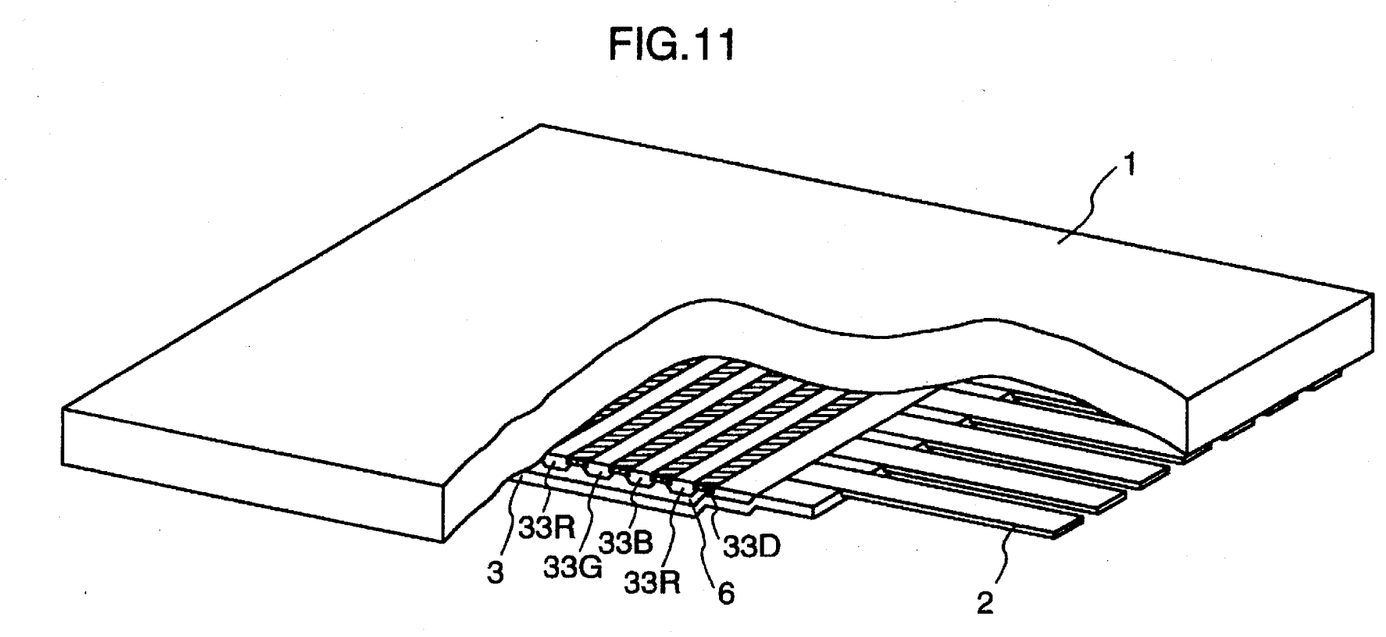
FIG. 11 is a cut-away perspective view showing a first transparent substrate included in the liquid crystal display device.

As shown in FIG. 11, a coloured display may be implemented by providing color filters 33R, 33G and 33B on the first transparent substrate 1 and a light cut-off film 33 between the adjacent filters. FIG. 10 shows the relation among the aligning direction of the liquid crystal molecules, the twisting direction of the liquid crystal molecules, the axial direction of the polarizing plate and the optical axis of the birefringent member in the foregoing embodiment.

As shown in FIG. 11, a nonlinear resistance film 6 is formed on the filters 33R, 33G, 33B, and the light cut-off film 33D. On the film 6 are formed the first transparent electrode 2 and the first insulating film 3.

Figure 12:
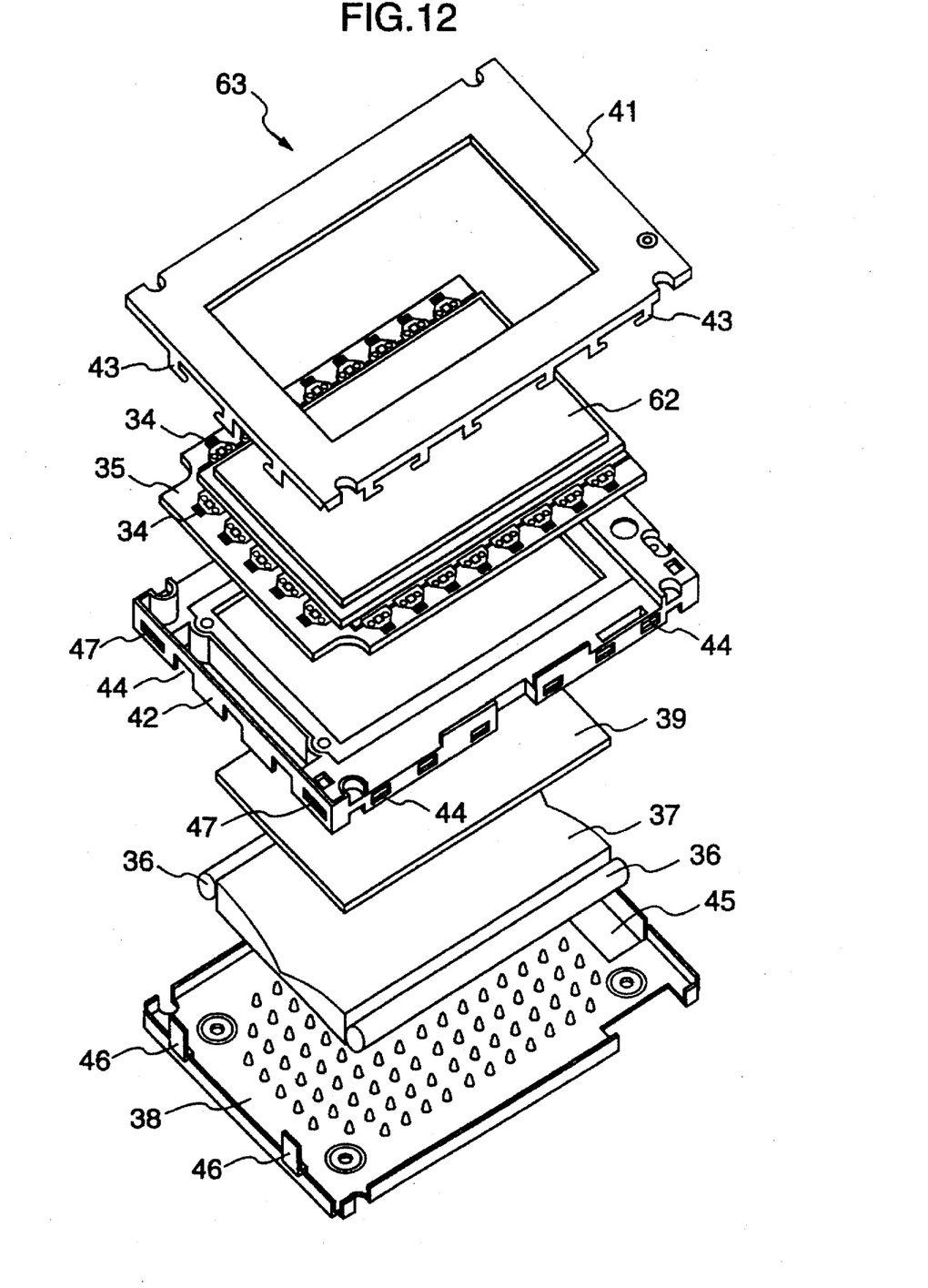
FIG. 12 is an exploded perspective view showing a liquid crystal display module.

FIG. 12 is an exploded perspective view showing a liquid crystal display module 63 in which an LCD device, a driving circuit for driving the LCD device, and a light source are compactly and integrally assembled. The LCD device 62 is loaded on a printing substrate 35. An IC 34, that is, the driving circuit is loaded on the printing substrate 35 having the LCD device 62 on its center. The printing substrate 35 having the LCD device 62 fitted thereto is fitted to a window portion of a frame 42 formed of a plastic mold. On the printing substrate 35 is overlapped a metallic frame 41 having a pawl 43. The pawl 43 is bent into a cut-away 44 formed on the frame 42 for securing the frame 41 to the frame 42.

A cold cathode fluorescent tube 36 located on the top and the bottom of the LCD device 62, a light guiding plate 37 made of an acrylic plate for evenly emitting the ray of light from the fluorescent tube 36 to the liquid crystal display cell 60, a reflective plate 38 made of a metallic plate with a coat of white paint, and an opaque diffusion plate for diffusing the light guided by the plate 37 are fitted to the window of the frame 42 from its rear side in the order shown in FIG. 12. An inverter power source circuit (not shown) for switching on the fluorescent tube 36 is held in a concave portion (that is not shown and located as opposed to a concave portion 45 of the reflective plate 38) formed on the right portion of the rear side of the frame 42. The diffusion plate 39, the light guide plate 37, the cold cathode fluorescent tube 36 and the reflective plate 38 are secured by bending a tooth 46 extending on the reflective plate 38 inside to a small opening 47 formed on the frame 42.

Figure 13:
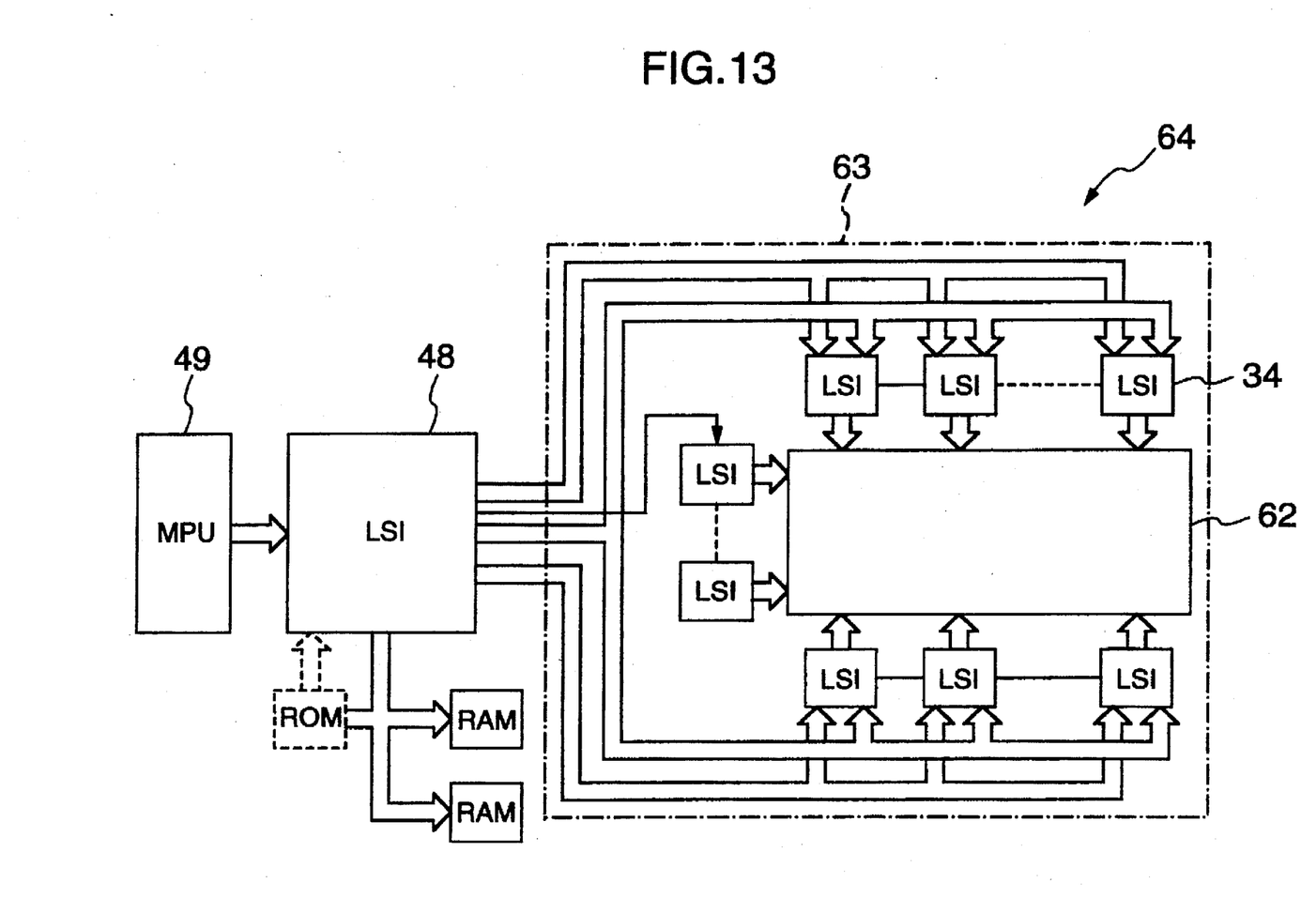
FIG. 13 is a block diagram showing a laptop computer configured to use the liquid crystal display device of the present invention.
Figure 14:
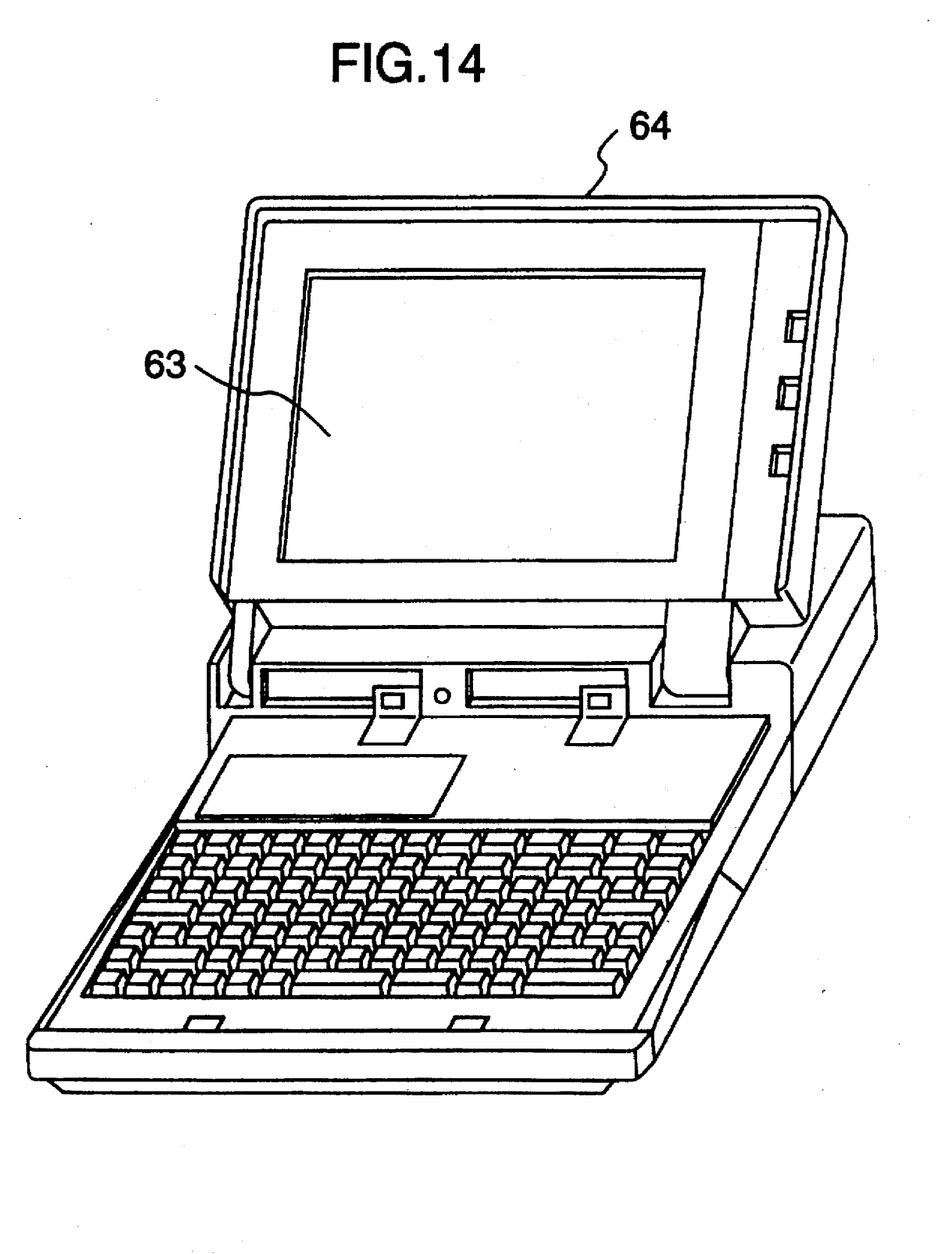
FIG. 14 is a perspective view showing the laptop computer.

FIG. 13 is a block diagram showing a laptop computer in which the liquid crystal display module 63 is used for the display unit. FIG. 14 is a perspective view showing the same laptop computer. In this laptop computer 64, the result operated by a microcomputer 49 is sent to a control LSI 48. The LSI 48 controls ICs 34 for driving the liquid crystal. As such, under the control of the LSI 48, the LCD module 63 is driven.

FIGS. 13 and 14 show the laptop computer having the LCD device according to the present invention. In addition, the LCD device may apply to a wordprocessor apparatus or an image display panel.

What is claimed is:

1. A liquid crystal display device comprising:
   a first unit having a first substrate, plural first electrodes formed on said first substrate and located in parallel to each other, a first nonlinear resistance film formed to cover said first substrate and said plural first electrodes and have a thickness of about 0.3 to 0.5 µm and a first insulating film formed on said first nonlinear resistance film and having a thickness of about 0.04 to 0.07 µm;
   a second unit having a second substrate, plural second electrodes formed on said second substrate and located in parallel to each other and orthogonally to said first substrate, a second nonlinear resistance film formed to cover said plural second electrodes and said second substrate and have a thickness of about 0.3 to 0.5 µm, and a second insulating film formed on said second nonlinear resistance film and having a thickness of about 0.04 to 0.07 µm; and
   a liquid crystal layer formed between said first unit and said second unit and having a thickness of about 2.0 to 4.0 µm.

2. A liquid crystal display device as claimed in claim 1, wherein said first insulating film is a first alignment film and said second insulating film is a second alignment film.

3. A liquid crystal display device as claimed in claim 1, wherein said first and second nonlinear resistance films each have a dielectric constant of about 3.0 or less.

4. A liquid crystal display device as claimed in claim 1, wherein said first and second nonlinear resistance films each contain a sintered mixture of silicon dioxide and zinc oxide, tin oxide or titanium oxide.

5. A liquid crystal display device as claimed in claim 4, wherein a weight ratio of silicon dioxide to zinc oxide, tin oxide or titanium oxide contained in the sintered material is about 9 to 1.

6. A liquid crystal display device, comprising:
   a first unit having a first substrate, plural first electrodes formed on said first substrate and located in parallel to each other, a nonlinear resistance film formed to cover said first substrate and said plural first electrodes and having a thickness of about 0.3 to 0.5 am, and a first insulating film formed on said nonlinear resistance film and having a thickness of about 0.04 to 0.07 µm;
   a second unit having a second substrate, plural second electrodes formed on said second substrate and located in parallel to each other and orthgonally to said first electrodes, and a second insulating films formed to cover said plural second electrodes and said second substrate and having a thickness of about 0.04 to 0.07 µm; and
   a liquid crystal layer formed between said first and said second unit and having a thickness of about 2.0 to 4.0 µm;
   wherein said nonlinear resistance film contains a sintered mixture of silicon dioxide and zinc oxide, tin oxide or titanium oxide.

7. A liquid crystal display device as claimed in claim 6, wherein a weight ratio of silicon dioxide and zinc oxide, tin oxide or titanium oxide contained in said sintered mixture is about 9 to 1.

8. A liquid crystal display device according to claim 6, wherein said nonlinear resistance film has a dielectric constant of no more than 3.

9. A liquid crystal display device, comprising:

a first unit having a first substrate, plural first electrodes formed on said first substrate and in parallel to each other, and a first insulating film formed to cover said plural first electrodes and said first substrate and having a thickness of about 0.04 to 0.07 µm;

a second unit having a second substrate, plural second electrodes formed on said second substrate and located in parallel to each other and orthogonally to said first electrodes, a nonlinear resistance film formed to cover said plural second electrodes and said second substrate and having a thickness of about 0.3 to 0.5 µm and a second insulating film formed on said nonlinear resistance film and having a thickness of about 0.04 to 0.07 µm; and a liquid crystal layer formed between said first and second units and having a thickness of about 2.0 to 4.0 µm;

wherein said nonlinear resistance film contains a sintered mixture of silicon dioxide and zinc oxide, tin oxide or titanium oxide.

10. A liquid crystal display device as claimed in claim 9, wherein a weight ratio of the mixture of silicon dioxide and zinc oxide, tin oxide or titanium oxide contained in said sintered material is about 9 to 1.

11. A liquid crystal display device according to claim 9, wherein said nonlinear resistance film has a dielectric constant of no more than 3.

12. A method for manufacturing a liquid crystal display panel comprising the steps of:

for making a first unit, forming plural first electrodes on a first substrate and in parallel to each other, forming a first nonlinear resistance film having a thickness of about 0.3 to 0.5 µm in such a manner as to cover said plural first electrodes, and forming a first insulating film having a thickness of about 0.04 to 0.07 µm on said first nonlinear resistance film;

for making a second unit, forming plural second electrodes on a second substrate in such a manner as to cross said first electrodes at right angles respectively, forming a second nonlinear resistance film having a thickness of about 0.3 to 0.5 µm, and forming a second insulating film having a thickness of about 0.04 to 0.07 µm on said second nonlinear resistance film; and forming a liquid crystal layer having a thickness of about 2.0 to 4.0 µm between said first and second units.

13. A method for manufacturing a liquid crystal display panel comprising the steps of:

for making a first unit, forming plural first electrodes on a first substrate and in parallel to each other, forming a nonlinear resistance film having a thickness of 0.3 to 0.5 µm and a dielectric constant of no more than 3 in such a manner as to cover said first substrate and said plural first electrodes, and forming a first insulating film having a thickness of about 0.04 to 0.07 µm on said nonlinear resistance film;

for making a second unit, forming plural second electrodes on a second substrate in such a manner as to cross said first electrodes at right angles respectively, and forming a second insulating film having a thickness of about 0.04 to 0.07 µm in such a manner as to cover said plural second electrodes and said second substrate; and forming a liquid crystal layer having a thickness of about 2.0 to 4.0 µm between said first and second units.

14. A method for manufacturing a liquid crystal display panel comprising the steps of:

for making a first unit, forming plural first electrodes on a first substrate and in parallel to each other, and forming a first insulating film having a thickness of about 0.04 to 0.07 µm in such a manner as to cover said first substrate and said plural first electrodes;

for making a second unit, forming plural second electrodes on a second substrate and in parallel to each other and in such a manner as to cross said first electrodes at right angles respectively, forming a nonlinear resistance film having a thickness of about 0.3 to 0.5 µm and a dielectric constant of no more than 3 in such a manner as to cover said plural second electrodes and said second substrate, and forming a second insulating film having a thickness of about 0.04 to 0.07 µm on said nonlinear resistance film; and forming a liquid crystal layer having a thickness of about 2.0 to 4.0 µm between said first and second units.

15. A liquid crystal display device comprising:

a first unit having a first transparent substrate, a color filter layer formed on said first transparent substrate, first plural transparent electrodes formed on said color filter layer, a nonlinear resistance layer formed to cover said color filter layer having a predetermined thickness and said first transparent electrodes, said nonlinear resistance layer having a dielectric constant of no more than 3, and a first molecular alignment layer formed on said nonlinear resistance layer;

a second unit having a second transparent substrate, second plural transparent electrodes thereon arranged to extend transversely to said first plural transparent electrodes and a second molecular alignment layer formed to cover said second transparent substrate and said second plural transparent electrodes; and a liquid crystal layer sandwiched between said first and second unit with said first and second plural transparent electrodes being arranged to oppose each other.

16. A liquid crystal display device according to claim 15, wherein said thickness of said nonlinear resistance layer is substantially 0.3 to 0.5 µm.

17. A liquid crystal display device comprising:

a first unit having a first transparent substrate, a color filter layer formed on said first transparent substrate, first plural transparent electrodes formed on said color filter layer and a first molecular alignment layer to cover said first transparent substrate and said first plural transparent electrodes;

a second unit having a second transparent substrate, second plural transparent electrodes thereon arranged to extend transversely to said first plural transparent electrodes, a nonlinear resistance layer formed to cover said second transparent substrate and said second plural transparent electrodes and having a predetermined thickness and a dielectric constant of no more than 3, and a second molecular alignment layer formed to cover said nonlinear resistance layer; and a liquid crystal layer sandwiched between said first and second unit with said first and second plural transparent electrodes being arranged to oppose each other.

18. A liquid crystal display device according to claim 17, wherein said thickness of said nonlinear resistance layer is substantially 0.3 to 0.5 µm.

* * * * *